3,148,197
PROCESS FOR THE PRODUCTION OF
ETHYLENE SULPHIDE
Paul Vannel, Lagor, France, assignor to Societe Nationale des Petroles d'Aquitaine, a French company
No Drawing. Filed Sept. 12, 1962, Ser. No. 223,277
Claims priority, application France Sept. 16, 1961
6 Claims. (Cl. 260—327)

The present invention is concerned with a process for the production of ethylene sulphide.

Various methods of preparing ethylene sulphide are already known. This compound was discovered by Delepine (Bull. Soc. Chim. France, 27, page 740 (1920)) who prepared it by a reaction between 1-chloro-2-thiocyanato-ethane and sodium sulphide, with a yield of the order of 20%.

The compound has also been prepared by reaction between ethylene oxide and potassium thiocyanate or thiourea, which leads to a total yield of 90%, making allowance for the product which is polymerised as a result of its instability.

2-chloro-ethylmercaptan has also been reacted with sodium bicarbonate at a pH of from 5 to 11, which gives a yield of the compound of less than 50%. The compound has also been prepared by the pyrolysis of 1,3-oxathiolanne-2-one (or ethylene monothiocarbonate) at 200° C., this starting material itself being obtained by reaction between 2-mercapto-ethanol and phosgene in the presence of pyridine. The yield in the first stage is from 40 to 50% and the yield in the second stage (pyrolysis) is 90%.

A yield of 40% of the compound has been obtained by reaction of ethylene oxide with carbon oxysulphide.

All these methods have certain disadvantages which are variously due to the limited yields obtained, to the instability of the resulting ethylene sulphide, to the impurities contained in the final product or to the price of or difficulties in manipulating the starting materials. In particular, the reactions which are carried out in an aqueous medium lead to an unstable ethylene sulphide which polymerises very rapidly.

The preparation of cyclic sulphides by heating cyclic carbonates with an equimolecular quantity of potassium thiocyanate in accordance with the following reaction:

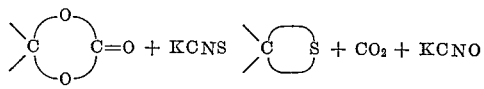

has already been described.

According to this method, a cyclic carbonate of a 1,2-diol or of a 1,3-diol is heated with an equimolecular quantity of potassium thiocyanate. If the aforesaid carbonate is ethylene carbonate and a reaction temperature of 95° C. is used, ethylene sulphide is obtained in a yield of 64.5% (boiling point 54–54.5° C.; $n_D^{20}=1.4950$).

The present invention relates to improvements in the process referred to above which enable ethylene sulphide to be obtained in a high yield of the order of 80%, using a single-stage reaction, raw materials which are easily available and relatively simple equipment. The ethylene sulphide obtained according to the present invention is, moreover, strictly pure without preliminary rectification and its stability is excellent. Since the operation is effected in an anhydrous medium, it is possible to recover the by-products; in particular, the potassium cyanate formed is not decomposed and can be separated by extraction with an appropriate solvent.

According to the invention, in the preparation of ethylene sulphide by the reaction of ethylene carbonate and potassium thiocyanate, an excess of ethylene carbonate is used, this excess preferably being a molar excess of from 10 to 20%.

Advantageously the potassium thiocyanate is introduced progressively at a uniform rate into the reaction mixture, the rate of addition being such as to maintain an excess of ethylene carbonate throughout the reaction.

A table summarising the results of a number of experiments in which the excess of ethylene carbonate was varied is given below; in the tests 3 to 7, the thiocyanate was introduced progressively during 45 minutes and otherwise all conditions were the same.

| | Reagents | | Excess Ethylene carbonate, percent | Ethylene sulphide obtained, g. | Yield | |
|---|---|---|---|---|---|---|
| | KCNS, moles | Ethylene carbonate, moles | | | KCNS, percent | Ethylene carbonate, percent |
| 1 | 2 | 2 | 0 | 66 | 55 | 55 |
| 2 | 2 | 2.28 | 14 | 78 | 65 | 57 |
| 3 | 2 | 2 | 0 | 78 | 65 | 65 |
| 4 | 2 | 2.28 | 14 | 94 | 78 | 69 |
| 5 | 2 | 2.40 | 20 | 92 | 77 | 64 |
| 6 | 2 | 2.60 | 30 | 85 | 71 | 55 |
| 7 | 2 | 3 | 50 | 83 | 70 | 47 |

It will be seen from these results that optimum yields were obtained with a molar excess of ethylene carbonate of the order of 14 to 20%. In tests 1 and 2 summarised in the table, the total quantity of the two reagents were mixed together at the start of the reaction, and it will be seen that this procedure does not give such good results as the progressive addition of the thiocyanate as carried out in tests 3 to 7.

Too great an excess of ethylene carbonate does not improve the yield, but rather tends to reduce it. This may be explained by the fact that the dilution resulting from an increased excess of ethylene carbonate increases the duration of the reaction and thus encourages the formation of complex thiocyanogen polycarbonates.

The reaction is normally carried out at a temperature of from 95° to 125° C. and it is preferred to employ a temperature from 95° to 100° C.; if too high a temperature is used, the yield is reduced.

The following example is given by way of illustration only:

200 g. of ethylene carbonate (2.27 mols) were heated to 95–100° C. in a 500 cc. reaction vessel provided with a mechanical agitator. 196 g. of potassium thiocyanate (2 mols) were then introduced progressively at a uniform rate for a period of from 30 to 45 minutes. Carbon dioxide gas was liberated and the ethylene sulphide formed was condensed. The reaction was continued at the temperature indicated for about 2 hours 30 minutes to 3 hours. At the end of this time the evolution of $CO_2$ was insignificant and the reaction could be regarded as terminated. 94 g. of ethylene sulphide of great purity were recovered.

Analysis of the residue showed that 6% of the KCNS had not reacted and that 88% of the theoretical quantity of KCNO had been formed.

After being stored for three months, the ethylene sulphide obtained contained less than 1% of polymer without any stabiliser having been added.

I claim:

1. A process for the production of ethylene sulphide, which comprises the step of reacting potassium thiocyanate with a 10% to 20% molar excess of ethylene carbonate at a temperature of from 95° to 125° C.

2. A process according to claim 1, wherein the potassium thiocyanate is progressively added to the reaction mixture at a uniform rate whereby an excess of ethylene carbonate is maintained in said reaction mixture throughout the reaction.

3. A process according to claim 1, wherein the reaction is carried out at a temperature of from 95° to 100° C.

4. A process according to claim 1 wherein the reaction is carried out under anhydrous conditions.

5. A process according to claim 2 wherein potassium thiocyanate is added over a period of from 30–45 minutes.

6. A process for the production of ethylene sulphide comprising reacting potassium thiocyanate with a 10% to 20% molar excess of ethylene carbonate under anhydrous conditions at a temperature of from 95° to 125° C., said potassium thiocyanate being progressively added to the reaction mixture at a uniform rate over a period of from 30–45 minutes whereby an excess of ethylene carbonate is maintained in said reaction mixture throughout the reaction.

References Cited in the file of this patent

Searles et al.: Jour. Amer. Chem. Soc., vol. 80 (1958), page 3168.

Hogness et al.: Qual. Anal. and Chem. Equilib., Henry Holt and Co., New York (1947), pp. 74, 75 and 87–90.

Kolthoff et al.: Textbook of Quant. Inorg. Anal., MacMillan Co., New York (1952), page 250.